A. R. HAVENER.
MACHINE FOR SETTING RIVETS.
APPLICATION FILED APR. 25, 1911.

1,016,940.

Patented Feb. 13, 1912.
5 SHEETS—SHEET 1.

Witnesses:
Sydney E. Taft.
Leonard A. Powell.

Inventor:
Arthur R. Havener,
by his attorney

A. R. HAVENER.
MACHINE FOR SETTING RIVETS.
APPLICATION FILED APR. 25, 1911.

1,016,940.

Patented Feb. 13, 1912.
5 SHEETS—SHEET 4.

Witnesses:
Sydney E. Taft
Leonard A. Powell

Inventor:
Arthur R. Havener,
by his attorney,
Charles F. Gooding

A. R. HAVENER.
MACHINE FOR SETTING RIVETS.
APPLICATION FILED APR. 25, 1911.

1,016,940.

Patented Feb. 13, 1912.
5 SHEETS—SHEET 5.

UNITED STATES PATENT OFFICE.

ARTHUR R. HAVENER, OF WALTHAM, MASSACHUSETTS, ASSIGNOR TO JUDSON L. THOMSON M'F'G CO., A CORPORATION OF MASSACHUSETTS.

MACHINE FOR SETTING RIVETS.

1,016,940.

Specification of Letters Patent. Patented Feb. 13, 1912.

Application filed April 25, 1911. Serial No. 623,136.

*To all whom it may concern:*

Be it known that I, ARTHUR R. HAVENER, a citizen of the United States, residing at Waltham, in the county of Middlesex and State of Massachusetts, have invented new and useful Improvements in Machines for Setting Rivets, of which the following is a specification.

This invention relates to a machine for setting rivets in sheet material, the machine being particularly adapted to set rivets in tires for automobiles.

The object of the invention is to provide a machine of the character set forth which is adapted to set rivets in automobile tires and hold the material in which the rivets are set in curvilinear form in cross section during the setting of said rivets, as distinguished from machines in which the rivets are set in the sheet material of which the tire is formed while said sheet material is flat and before it is bent.

The advantage gained by setting the rivets in the tire and simultaneously shaping the tire into a semi-circular form in cross section is that the rivets assist materially in holding the tire in said cross sectional shape after the setting operation is completed, whereas if the rivets are set in the sheet material prior to its being formed in a semi-circular shape, or while the tire is flat in cross section, it will be much more difficult to subsequently bend the tire into a cross-section of semi-circular contour.

The invention consists in the combination and arrangement of parts set forth in the following specification and particularly pointed out in the claims thereof.

Figure 1:
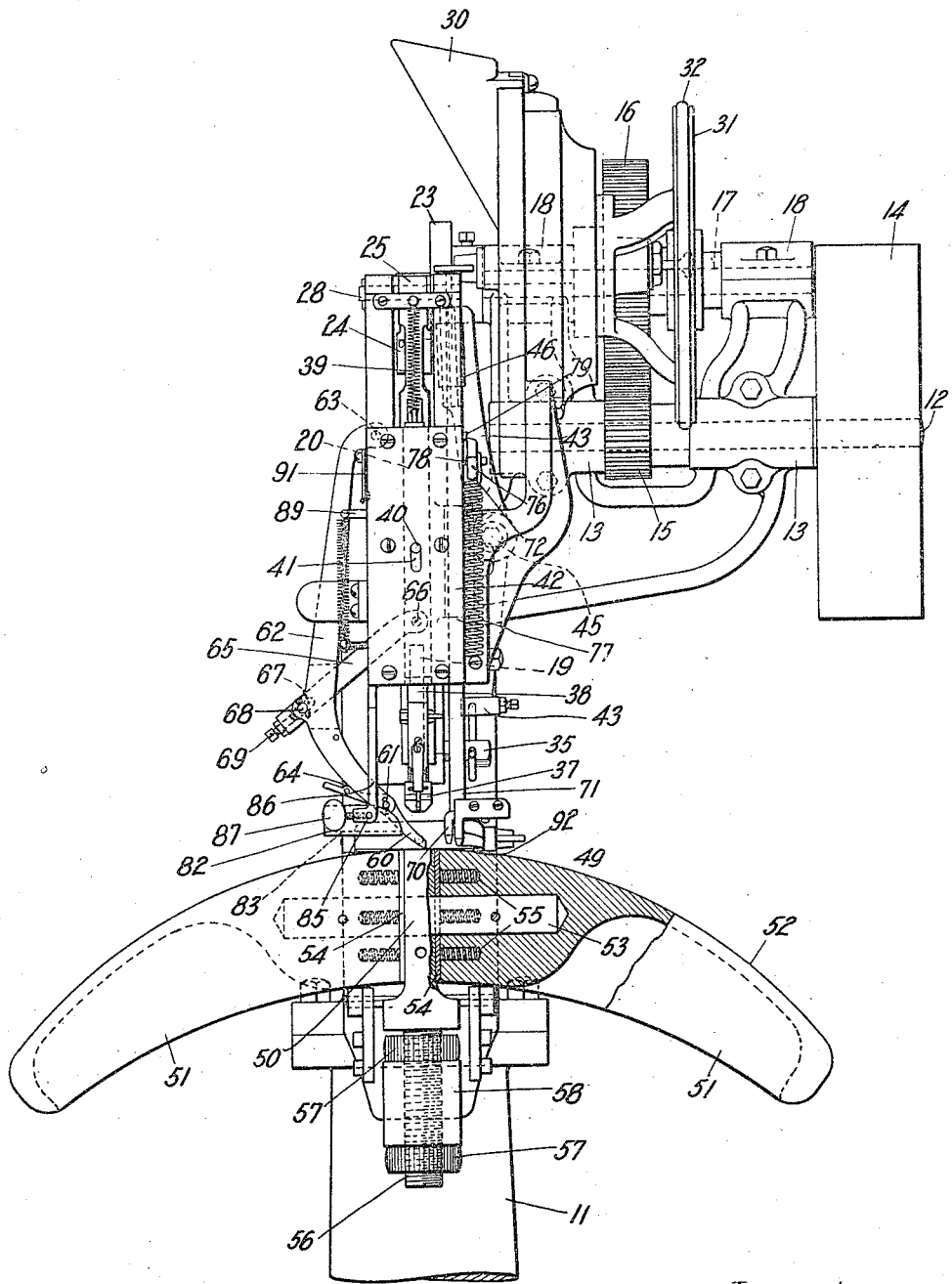
Figure 2:
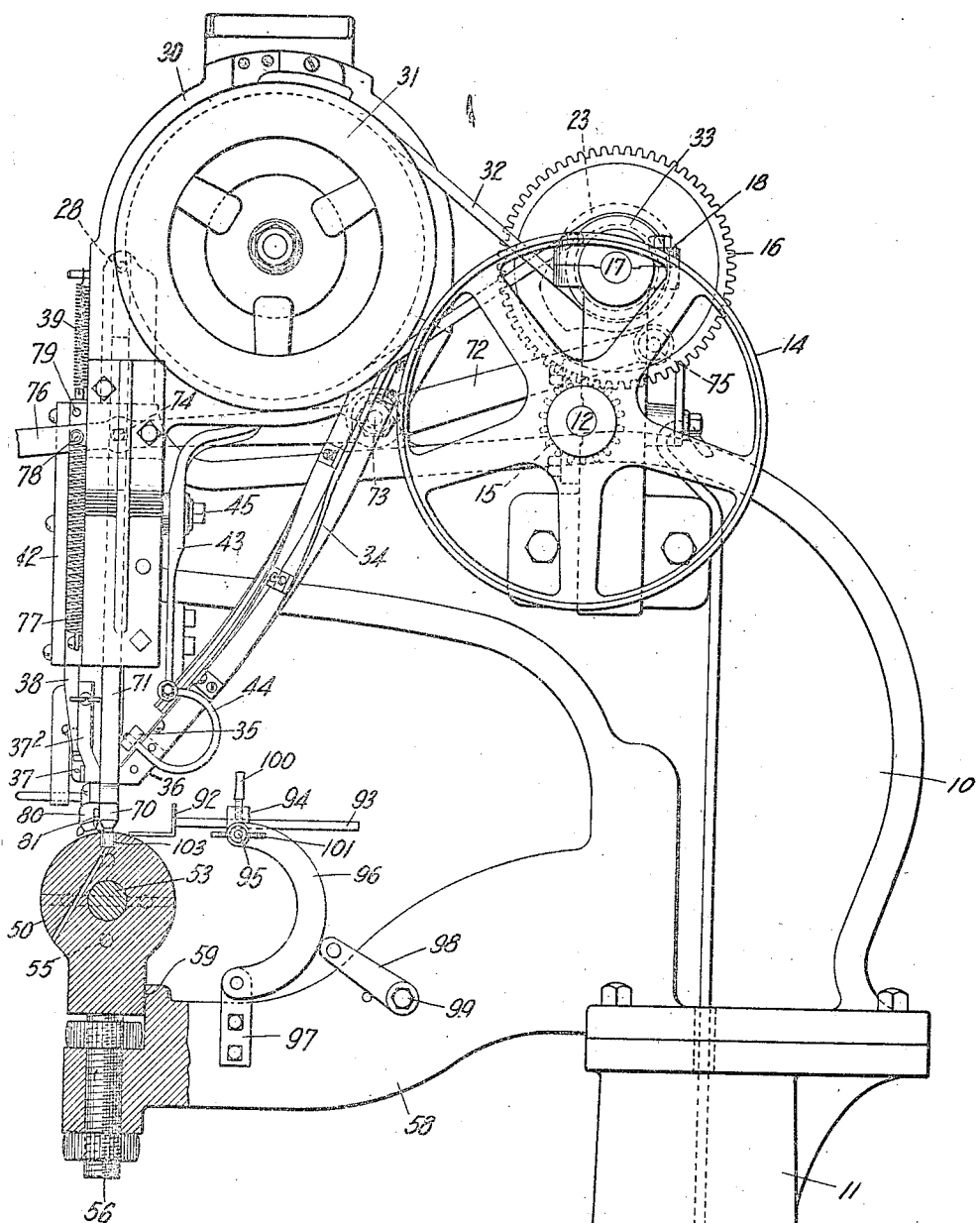
Figure 3:
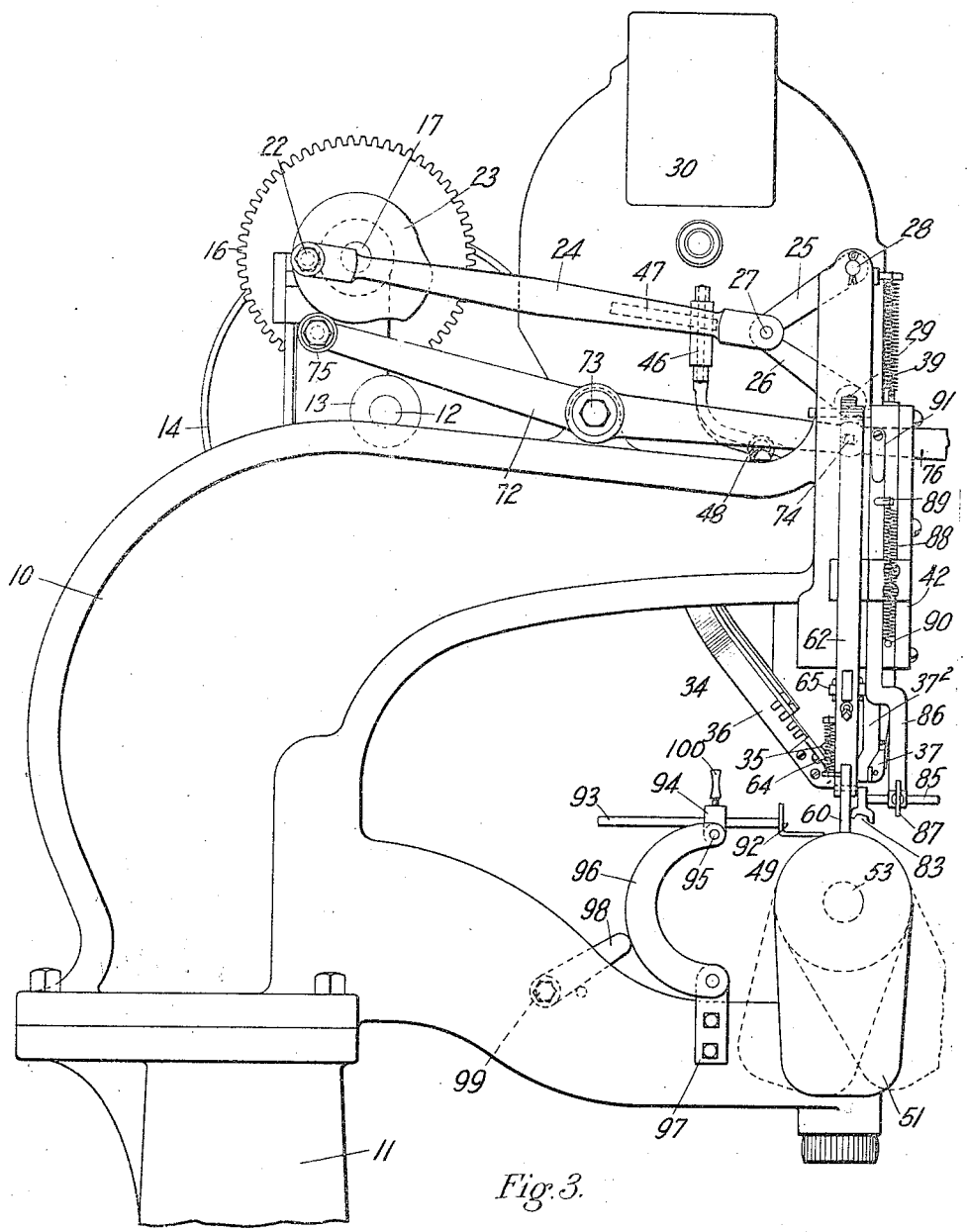
Figure 4:
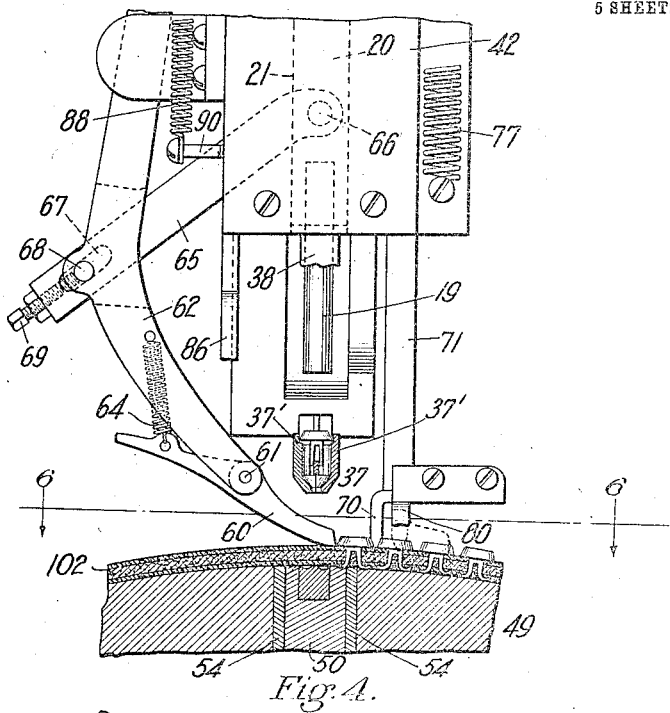
Figure 5:
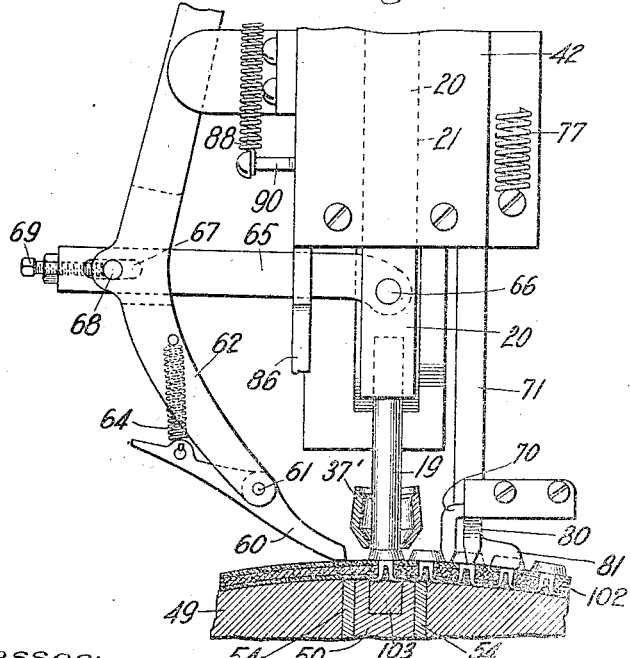
Figure 6:
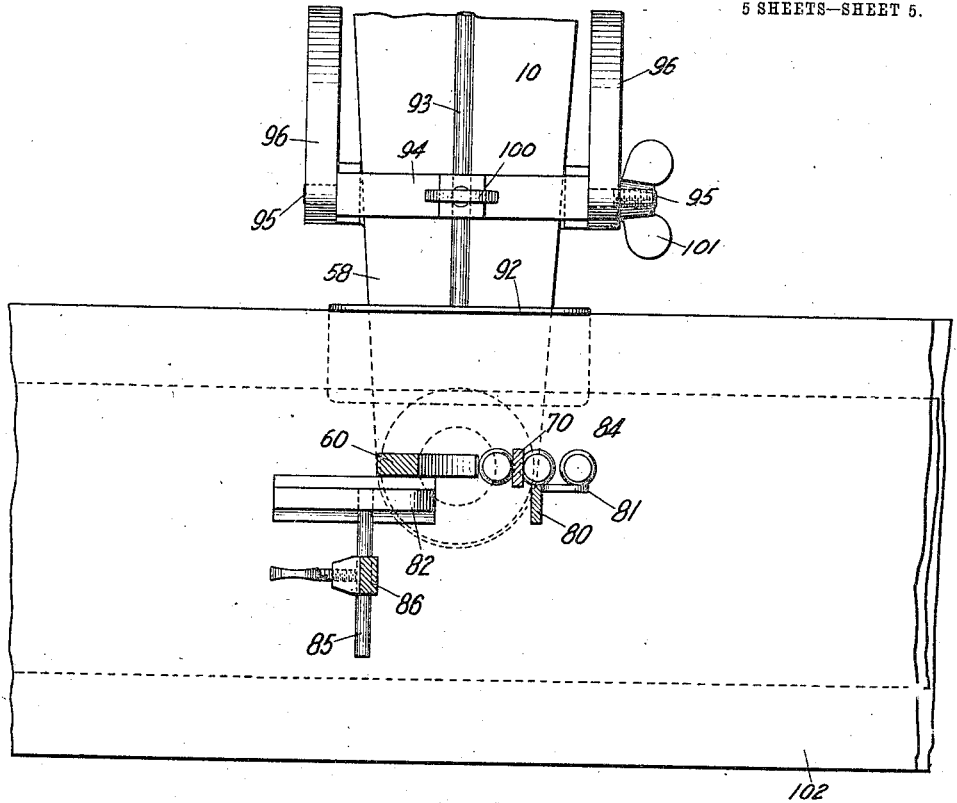
Figure 7:
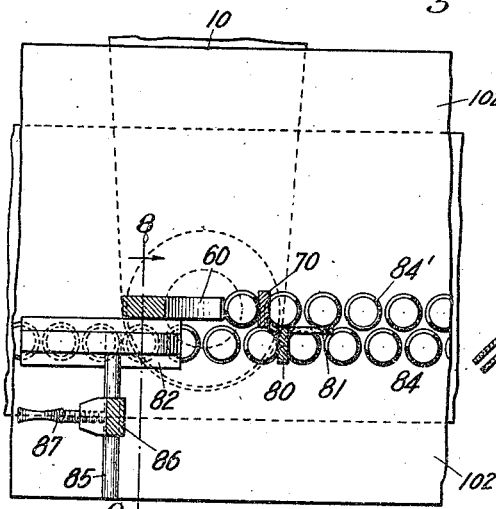
Figure 8:
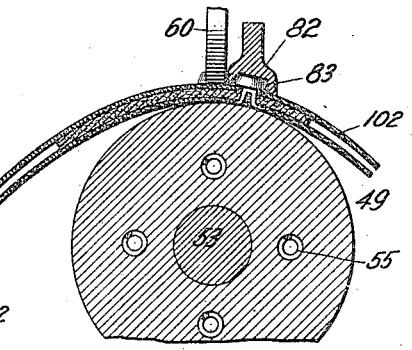

Referring to the drawings: Figure 1 is a front elevation of my improved rivet setting machine, with the work-support broken away and shown in section. Fig. 2 is a side elevation of the same, as viewed from the right of Fig. 1, the work-support and a portion of the arm upon which it is supported being shown in section. Fig. 3 is a side elevation of the machine as viewed from the left of Fig. 1, the work-support being shown in dotted lines in different positions. Fig. 4 is an enlarged front elevation, partly in section, of the rivet setting mechanism, and work-support with a tire in position thereon and several rivets set in said tire, the driver and rivet holder being shown elevated. Fig. 5 is a view similar to Fig. 4, with the parts in the relative positions occupied thereby when the rivet is being set in the tire. Fig. 6 is a sectional plan taken on line 6—6, Fig. 4, showing the tire as it is placed when the first row or series of rivets is being set therein. Fig. 7 is a sectional plan similar to Fig. 6 illustrating the tire in the position occupied thereby when the second row of rivets is being set. Fig. 8 is a detail sectional elevation taken on line 8—8 of Fig. 7.

Like numerals refer to like parts throughout the several views of the drawings.

In the drawings, 10 is the frame of the machine supported upon a column 11. 12 is the driving shaft journaled in bearings 13, 13 on said frame and driven by a pulley 14. Said shaft 12 has a pinion 15 fast thereto which meshes into a gear 16 fast to a shaft 17 journaled in bearings 18, 18 on the frame of the machine. The driver 19 is fastened to a driver-bar 20 arranged to slide in ways 21 formed in the frame of the machine and a reciprocatory motion is imparted to said driver by a crank-pin 22 fast to a cam-plate 23 which, in turn, is fastened to the left hand end of the shaft 17. The crank-pin 22 is connected by a link 24 to two links 25 and 26, the link 24 being connected to said links 25 and 26 by a pin 27. The link 25 is pivoted at 28 to the frame of the machine. The link 26 is connected by a pin 29 to the driver-bar 20. Thus, as the shaft 17 rotates, the crank-pin 22 moves the connecting link 24 longitudinally of said link (Fig. 3) and through the links 25 and 26 a reciprocatory motion is imparted to the driver-bar 20.

The rivets are placed in mass in a hopper 30 having a rotary feed wheel or separator therein (not shown in the drawings) to which a rotary motion is imparted by a pulley 31 driven by a cross-belt 32 from a pulley 33 fast to the gear 16. The rivets are fed from the hopper in a manner well known to those skilled in this art onto a raceway 34 down which they pass to a separator 35 which feeds them one by one from the upper part to the lower part of the raceway, and from the lower part 36 of the raceway they pass into the rivet holder 37, into which they drop one by one as illustrated in Fig. 4. The holder 37 is supported upon the lower end of a slide 38 arranged to slide in ways and held normally in its elevated position, as shown in Fig. 1, by a spring 39. A stop-pin 40 is fastened to the holder slide 38 and projects into a slot 41 in the front plate 42. Said holder 37 is made in two parts 37′, 37′ which are fastened to springs 37², 37² which, in turn, are fastened to the slide 38, and these springs yield to allow the rivet to be pushed out of the holder by the driver when the same descends in a manner well known to those skilled in this art.

A reciprocatory motion is imparted to the separator 35 by a lever 43 which is connected to said separator by a spring arm 44 and is pivoted at 45 to the frame of the machine. The upper end of the lever 43 (see Fig. 3) has a roll 46 journaled thereon which bears against an incline 47 on the link 24. A spring 48 holds the roll 46 against the incline 47.

The piece of sheet material or tire 102 into which the rivets are to be driven is supported upon a work-support 49 consisting of a central member or holder 50 and two horn-shaped members 51, 51 rotatably mounted on opposite sides, respectively, of said central member 50. The work-support, as a whole, is convexly curved on the side 52 thereof adjacent to the driver 19 and is located beneath said driver. Said holder is circular in cross section, as illustrated in Fig. 8. The horns 51, 51 are fastened to an axis 53 which extends transversely of the driver 19 and is rotatably mounted in the central member or support 50. Interposed between the horns 51, 51 and the central member 50 of the work support are friction rings 54, 54 which are pressed against the central member 50 by springs 55, 55 located in recesses provided in the horns 51, 51. The central member 50 terminates at its lower end in a screw-threaded shank 56 provided with adjusting nuts 57, 57, one of which is mounted above and the other below the arm 58 of the frame 10. By means of these adjusting nuts the work-support can be raised and lowered as desired, the same being prevented from rotating by a straight flat portion 59 which bears against a straight flat surface adjacent thereto on the arm 58.

The tire is fed toward the right (Fig. 1) by a feed finger 60 which is pivoted at 61 to a lever 62, said lever 62 being pivoted at 63 (Fig. 1) to the frame of the machine. The free end of the feed finger 60 is held with a yielding pressure against the surface of the tire which is fed thereby by means of a spring 64 and is moved from left to right and vice versa by a link 65 which is pivoted at one end thereof to a pin 66 fast to the driver bar 20. At its outer or free end the link 65 is slotted at 67 and through this slot projects a pin 68 which is fast to the lever 62.

The position of the lower end of the feed finger 60 may be regulated by means of the adjusting screw 69 having screw-threaded engagement with the link 65 and bearing at its inner end against the pin 68, whereby, by turning the screw 69 in one direction or the other, the pin 68 may be moved along the slot 67 and thus the lower end of the feed finger will be moved or adjusted to the desired location. It will thus be seen that by means of the screw 69 the length of feed or the distance which the tire is moved on the work-support may be increased or diminished.

As the driver moves down the feed lever 62 and feed finger 60 will be moved toward the left (Fig. 1) as soon as the right hand end of the slot 67 abuts against the pin 68, and as the driver moves upwardly the lever 62 will be swung, together with the feed finger 60, toward the right, thus feeding the tire along the work-support, it being understood that the end of the feed finger, in the feeding operation, abuts against the rivet which has been set last in the tire by the driver, as hereinafter more fully explained.

In order to insure accuracy of feed, a stop 70 is provided which is fastened to a slide 71, this slide being mounted in ways in the frame of the machine and a reciprocatory motion imparted thereto by means of a lever 72 pivoted at 73 to the frame of the machine. The lever 72 is connected to the slide 71 by a pin 74, and a rocking motion is imparted to the lever 72 by the cam plate 23 against which a frictional roll 75 journaled upon the lever 72 bears. The lever 72 terminates at its free end in a handle 76, whereby the same may be operated by hand, if desired, to raise and lower the stop 70. A spring 77, one end of which is fast to the outer end of the lever 72 and the other end to the frame of the machine holds the roll 75 in contact with the periphery of the cam 23. When it is desired to hold the stop out of contact with the work, the lever 72 is raised by the handle 76 and is held in an elevated position by the pin 78 which is fast to said lever, riding up over and resting upon a stationary bevel pin 79 fast to the frame of the machine. It will be noted that the lower end of the stop 70 is beveled to allow the same to project in between the heads of two adjacent rivets, as seen in Figs. 4 and 5.

On the same slide 71 is supported a gage 80 and the lower end of this gage is also beveled to project in between two adjacent rivets in another row of rivets from that row with which the stop 70 is in alinement. It will also be noted by reference to Figs. 6 and 7 that the stop 70 is in alinement with the feed finger 60 while the gage 80 is out of alinement with the feed finger 60 and also out of alinement with the stop 70, being adapted to project in between the beveled heads of two adjacent rivets in another row or series of rivets from that with which the stop 70 and feed finger 60 are in alinement.

A guide 81 is fastened to and projects laterally from the gage 80 and is arranged to project between two adjacent rows of rivets to guide the same as the material is being fed forward. Another guide 82 is provided which is grooved upon its under side at 83 to receive and guide the rivets and the material to which they are fastened. This guide 82 has a stem 85 which projects into the lower end of a slide 86 and is clamped thereto by a clamp-screw 87. The slide 86 slides in ways provided in the frame and is held downwardly against the material by a spring 88, one end of which is fastened to a pin 89 on said slide and the other end of which is fastened to a screw 90 on the frame of the machine. The guide 82 may be moved upwardly and held in its upward position by a spring clip 91 (see Figs 1 and 3).

An edge gage 92 is provided which is adapted to bear against the edge of the material when the first row of rivets is being driven therein, said gage having a stem 93 thereon which projects through a block 94 pivoted at 95 to arms 96 which, in turn, are pivoted to a bracket 97 fast to the frame of the machine. These arms 96 are held in the position illustrated in Fig. 2 by another arm 98 pivoted at 99 to the frame of the machine. When it is desired to throw the edge gage 92 backward out of the way, it may be done by first throwing the arm 98 out of the way and then tipping the arms 96 upon their pivots toward the right (Fig. 2). The stem 93 is clamped in position in the block 94 by a clamp-screw 100 and the block 94 is clamped in position upon the arms 96 by a clamp-screw 101.

The general operation of the machine hereinbefore specifically described is as follows: The tire is placed on the work-support 49 in the position illustrated in Fig. 6, with the edge of the same resting against the edge gage 92 and the machine operated to set the first row of rivets 84. In setting this row of rivets the driver descends, being driven by the mechanism hereinbefore described, carrying with it the holder 37 and the rivet contained therein, moving the same from the position illustrated in Fig. 4 until the pin 40 on the holder slide 38 arrives at the bottom of the slot 41, at which time the bottom of the rivet holder will be nearly in contact with the tire 102. Upon a continued downward movement of the driver-bar 20 and driver 19, the rivet will be forced out of the rivet holder through the tire 102 and will be clenched against an anvil 103 in the holder 50 of the work-support 49. The holder 37 and the slide 38 move upwardly as soon as the rivet is driven out of the same, and the driver, after having set the rivet, moves upwardly, while the feed finger 60 is brought forward by the lever 62 during the upward movement of the driver-bar and brings the free end of the feed finger 60 against the rivet which has just been set in the first row of rivets 84, thus moving said rivet and the tire to which it is attached toward the right (Fig. 6) until it abuts against the stop 70 which is moved downwardly in time to be engaged by the head of said rivet by the lever 72 and cam 23. The feed finger then retreats and the stop 70 is raised preparatory to the setting of another rivet in the tire and the feeding of the tire by means of the second rivet and the feed finger, as hereinbefore described.

After the first row of rivets 84 has been set, the tire is reversed upon the work-support, bringing the first row of rivets out in front of the driver, as illustrated in Fig. 7, and the second row of rivets 84' is then driven. During the driving of the second row of rivets, the tire is guided by the rivets of the first row, passing through the groove 83 in the under side of the guide 82. It is also guided or placed to correct any inaccuracy of position by the guide 81 and the gage 80 which, as the slide 71 descends with the stop 70, also brings downwardly said gage 80 and the guide 81, the gage 80 entering between two adjacent rivets in the series of rivets 84 and placing the tire in such a position that the rivets of the series of rivets 84' will be "staggered" with reference to the series of rivets 84, the relative location of the gage 80 and stop 70 being such that when the stop 70 is between two of the rivets of the series 84' the gage 80 will be in alinement with the middle of one of said rivets of the series 84'. The following rows of rivets will be driven in the same manner as hereinbefore described, the third row of rivets being "staggered" as to the second, but registering with the rivets in the row 84, while the fourth row of rivets will register with the rivets in the row 84' and consequently will be "staggered" as to the rivets in the row 84 and as to the third row of rivets.

If the tire is not in the exact position to correctly locate the rivets of one row with respect to the adjacent row which has just been driven, the beveled end of the gage 80 will enter between the adjacent beveled heads of the rivets in the row 84 and will push the tire toward the right or left to correctly locate the same for the reception of the new rivet. It will also be noted that the guide 81 in descending will also operate to correctly locate the row of rivets which has just been driven relatively to the driver.

During the operation hereinbefore described, the work-support is tipped around the median axial line of the shaft 53, so that the different rows of rivets will come beneath the driver without shifting the tire on the work-support laterally thereof, the different positions of the work support being illustrated in dotted lines in Fig. 3 to accomplish this end.

It will be seen that the presser foot guide 82 assists in shaping the tire so that it will be of semi-circular shape in cross sectional contour, particularly by reference to Fig. 8, in which the tire is shown pressed downwardly at the right of the row of rivets which is being set and as being bent into curvilinear shape in cross section, and this operation of bending continuous to be performed by the presser foot guide 82 as each subsequent row of rivets is fed therebeneath, so that finally the tire, when the rivets have been driven therein, has been formed into a semi-circular shape with the shanks of the rivets in one row of rivets converging toward the shanks of the rivets in the adjacent row of rivets.

Having thus described my invention, what I claim and desire by Letters Patent to secure is:

1. A riveting machine having, in combination, a rivet holder, a driver, and a work-support located beneath said driver, the working face of said work-support adjacent to and directly beneath said driver being circular in cross section and convexly curved longitudinally thereof on the side adjacent to said driver.

2. A riveting machine having, in combination, a rivet holder, a driver, and a work-support located beneath said driver, the working face of said work-support adjacent to and directly beneath said driver being circular in cross section and convexly curved on the side thereof adjacent to said driver, a portion of said work-support being rotatable about a median axial line extending transversely of said driver.

3. In a riveting machine, a convexly curved work-support, said work-support embodying a holder upon which are oppositely disposed members journaled to rotate about a median axial line extending transversely of said holder, said oppositely disposed members being circular in cross section and convexly curved longitudinally thereof.

4. In a riveting machine, a convexly curved work-support consisting of a central member constituting a holder and two horn-shaped members rotatably mounted on opposite sides, respectively, of said central member.

5. In a riveting machine, a convexly curved work-support consisting of a central member constituting a holder, a shaft journaled on said holder and extending transversely thereof, and two horn-shaped members fast to said shaft on opposite sides, respectively, of said holder.

6. In a riveting machine, a convexly curved work-support consisting of a central member constituting a holder, a shaft journaled on said holder and extending transversely thereof, two horn shaped members fast to said shaft on opposite sides, respectively, of said holder, and a frictional device interposed between said holder and horn-shaped members.

7. A machine for driving rivets into sheet material, having, in combination, a driver, a rivet holder, a work-support located beneath said driver, a feed-finger adapted to engage a rivet after it has been set in said sheet material by said driver and move said sheet material along said work-support, a stop in alinement with said feed finger adapted to be engaged by said rivet, and a gage out of alinement with said feed finger adjacent to said stop, said gage and stop located at unequal distances from said feed finger.

8. A machine for driving rivets into sheet material, having, in combination, a driver, a rivet holder, a work-support located beneath said driver, a feed-finger adapted to engage a rivet after it has been set by said driver in said sheet material and move said sheet material along said work-support, a stop in alinement with said feed finger adapted to be engaged by said rivet, a gage out of alinement with said feed finger adjacent to said stop, said gage and stop located at unequal distances from said feed finger and beveled at their lower ends, and mechanism adapted to raise and lower said gage and stop.

9. A machine for driving rivets successively in sheet material and in a series of rows of rivets, having, in combination, mechanism for setting a rivet, including a driver, mechanism adapted to engage each of the rivets in one of said rows consecutively and move said sheet material thereby, a stop adapted to be engaged by each of the rivets in said row consecutively, and a gage adapted to project between two adjacent rivets in another row of rivets fast to said sheet material.

10. A machine for driving rivets successively in sheet material and in a series of rows of rivets, having, in combination, mechanism for setting a rivet, including a driver, mechanism adapted to engage each of the rivets in one of said rows consecutively and move said sheet material thereby, a stop adapted to be engaged by each of the rivets in said row consecutively, a gage adapted to project between two adjacent rivets in another row of rivets fast to said sheet material, and a guide adapted to project between said rows of rivets adjacent to said stop and gage.

11. A machine for driving rivets successively in sheet material and in a series of rows of rivets, having, in combination, mechanism for setting a rivet, including a driver, mechanism adapted to engage each of the rivets in one of said rows consecutively and move said sheet material thereby, a stop adapted to be engaged by each of the rivets in said row consecutively, a gage adapted to project between two adjacent rivets in another row of rivets fast to said sheet material, and mechanism adapted to move said stop and gage toward and away from said sheet material.

12. A machine for driving rivets successively in sheet material and in a series of rows of rivets, having, in combination, mechanism for setting a rivet, including a driver, mechanism adapted to engage each of the rivets in one of said rows consecutively and move said sheet material thereby, a stop adapted to be engaged by each of the rivets in said row consecutively, a gage adapted to project between two adjacent rivets in another row of rivets fast to said sheet material, said stop and gage being located at one side of said driver, and a guide adapted to engage the rivets of said last-named row of rivets located at the opposite side of said driver.

In testimony whereof I have hereunto set my hand in presence of two subscribing witnesses.

ARTHUR R. HAVENER.

Witnesses:
CHARLES S. GOODING,
LOUIS A. JONES.